(No Model.)
A. R. WILSON.
MACHINE FOR GRINDING GLASSWARE.
No. 507,701. Patented Oct. 31, 1893.
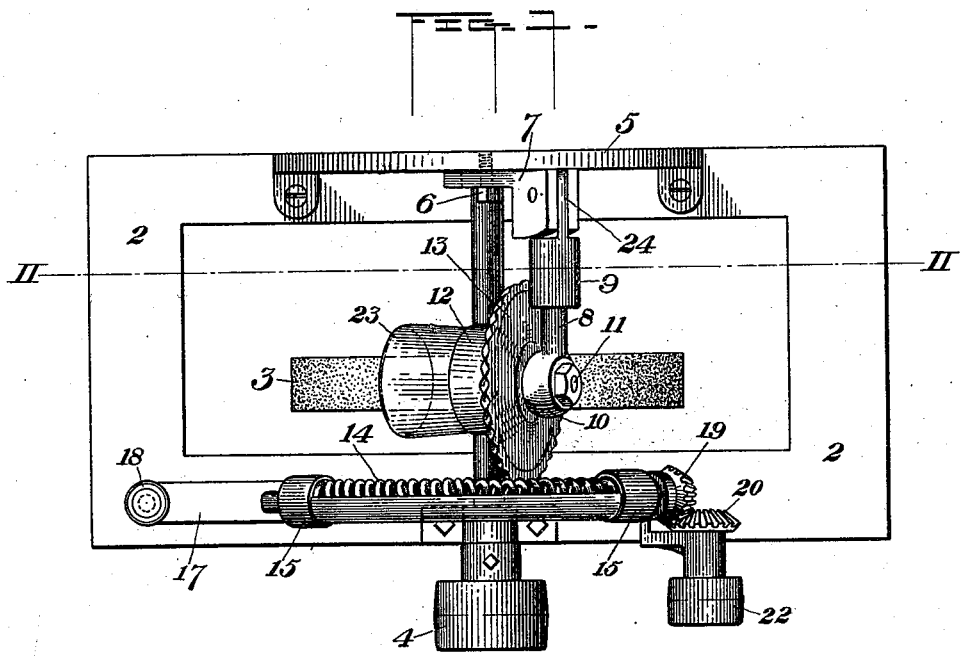
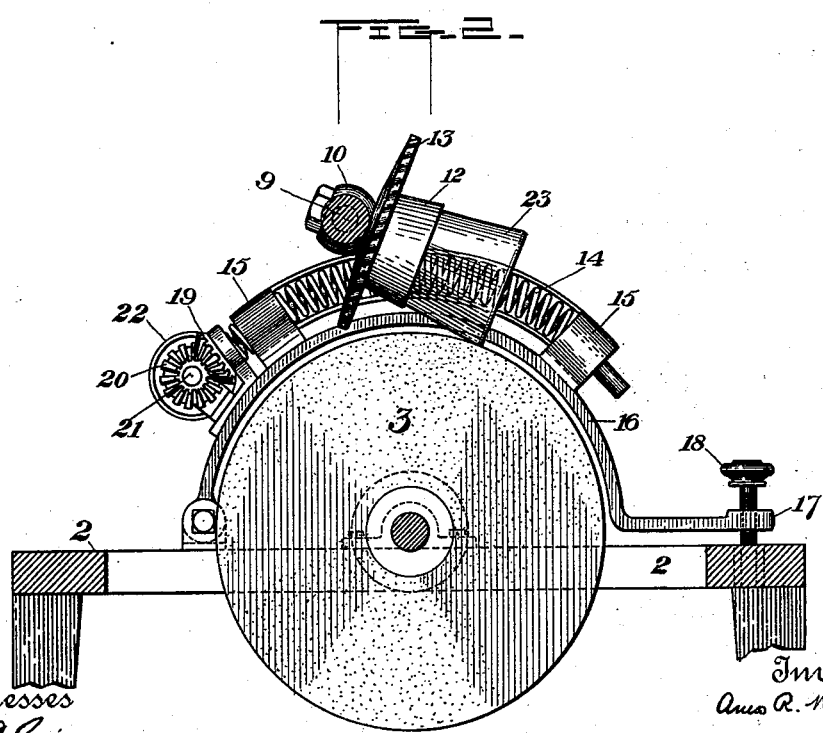
Witnesses
Inventor
Amos R. Wilson
by W. Bakewell & Son
Attorneys.

200~# UNITED STATES PATENT OFFICE.

AMOS R. WILSON, OF MARTIN'S FERRY, OHIO, ASSIGNOR OF ONE-HALF TO ANDREW D. SEAMON, OF WHEELING, WEST VIRGINIA.

MACHINE FOR GRINDING GLASSWARE.

SPECIFICATION forming part of Letters Patent No. 507,701, dated October 31, 1893.

Application filed July 8, 1893. Serial No. 479,902. (No model.)

*To all whom it may concern:*

Be it known that I, AMOS R. WILSON, of Martin's Ferry, in the county of Belmont and State of Ohio, have invented a new and useful Improvement in Machines for Grinding Articles of Glassware, of which the following is a full, clear, and exact description, reference being had to the accompanying drawings, forming part of this specification, in which—

Figure 1 is a plan view of the apparatus; and Fig. 2 is a vertical longitudinal section on the line II—II of Fig. 1.

My invention has for its object an improvement in apparatus for grinding and finishing the edges of tumblers, lamp-chimneys, lantern globes, and other articles of glassware, and it consists in an adjustable rotating snap or holder, devices for imparting motion to the holder, and a suitable grinding wheel, the holder being so mounted that any desired bevel or finish may be imparted to the edge of the tumbler or other article to be ground.

I will now describe my invention so that others skilled in the art may manufacture and use the same.

In the drawings, 2 represents the stand or frame on which is mounted the grinding-wheel 3, the shaft of which is provided with the band-wheel 4, by means of which power is applied to the wheel. Secured to the frame 2 on one side of the grinding wheel 3, is the curved bracket 5, adjustably secured to which, by means of a screw-bolt 6, is the arm 7, the bolt 6 passing through a longitudinal slot in the arm as shown in dotted lines in Fig. 1. Pivoted to the upper end of the arm 7 in a jaw 24 is a laterally extending arm comprising a socket 9, having a longitudinal hole, and a shank or rod 8 which fits within the socket and can turn axially therein, so that the chuck or snap for the glass can be turned away from the grinding wheel, or toward the same, for the purpose of attaching and removing a glass article. This arm extends to a point over the periphery of the grinding-wheel 3, and the shank or rod 8 is provided at its end with a collar 10 in which is journaled a chuck-shaft 11. On the lower end of this shaft is a chuck or snap 12, adapted to engage with and hold the article to be ground.

Keyed to the shaft 11 is a gear-wheel 13, the teeth of which mesh with a worm 14, which is preferably formed of wire so as to be flexible, and is mounted in bearings 15 on a supporting standard 16. One end of this standard 16 is pivoted to the frame 2, and the other end is provided with a flange 17 through which an adjusting screw 18 passes into a threaded collar in the frame 2. The standard can therefore be adjusted to keep the worm in mesh with the gear-wheel 13 to conform to the adjustment of the arm 7 to suit glass articles of different sizes. On one end of the worm 14 is a bevel gear-wheel 19, which meshes with a bevel wheel 20, on the shaft 21, which is mounted in bearings on the standard 16, and is provided with a band-wheel 22 by means of which power is applied to the shaft.

In tumblers and other articles of glassware, the edges, as they come from the cutting machine or mold, are sharp, rough or uneven and require finishing on a grinding-wheel. Heretofore, this finishing has commonly been effected by the workman, having the article in his hand, holding and working it against the grinding-wheel so as to produce, in the case of tumblers and some other articles, an even beveled edge. This operation is not only slow and tedious, but it requires the services of skilled labor.

The operation of my improved apparatus, which is designed to grind and finish the edges of glass articles automatically, is as follows:—The arm 7 is adjusted in position by means of the bolt 6, according to the size of the tumbler or other article to be finished and according to the bevel desired on the edge of the tumbler, and the worm 14 is adjusted by means of the screw 18, so that the worm will mesh with the gear-wheel 13. The tumbler 23 is then placed in the chuck 12, and the shank 8 is turned by hand or by gravity of the parts so as to bring the edge of the tumbler or other glass article against the periphery of the grinding wheel. Power is then applied to the worm 14, which causes the chuck 12 and tumbler 23 to rotate against the periphery of the revolving grinding wheel, and an even bevel is ground on the edge of the tumbler, without the necessity of employing skilled labor.

Although I have shown and described specific devices by means of which a beveled edge is automatically produced on articles of glassware, numerous changes in arrangement and construction of the parts may be made without departing from my invention, the advantages of which, as hereinbefore set forth, will be apparent to those skilled in the art.

Having thus described my invention, what I claim, and desire to secure by Letters Patent, is—

1. In apparatus for grinding hollow glass articles, the combination of a grinding wheel, a chuck arranged to hold a hollow glass article, in contact with the edge of said wheel and having an adjustable slotted support, and means for revolving said chuck in all positions; substantially as described.

2. In apparatus for grinding glassware, the combination of an adjustable chuck, a flexible worm gear connection, and a grinding-wheel; substantially as described.

3. In apparatus for grinding glassware, the combination of the adjustable chuck having a gear-wheel, the adjustable worm adapted to mesh with the gear-wheel, and a grinding-wheel; substantially as described.

4. In apparatus for grinding glassware, the combination with the grinding wheel, of a chuck arranged to hold the glass article in contact with the edge of the wheel and having a rotatable stem carried in a socket, and a slotted support carrying said socket; substantially as described.

In testimony whereof I have hereunto set my hand.

AMOS R. WILSON.

Witnesses:
A. W. KERR,
ROSS MOSSGROVE.